United States Patent [19]

Tsunekawa et al.

[11] Patent Number: 5,659,437
[45] Date of Patent: Aug. 19, 1997

[54] DATA STORAGE APPARATUS HAVING SERVO CONTROL SYSTEM

[75] Inventors: Masao Tsunekawa; Mitsuo Kamimura, both of Kawasaki; Eisaku Takahashi, Higashine, all of Japan

[73] Assignee: Fujitsu Limited, Kawasaki, Japan

[21] Appl. No.: 385,661

[22] Filed: Feb. 7, 1995

[30] Foreign Application Priority Data

Mar. 17, 1994 [JP] Japan .................................. 6-047517

[51] Int. Cl.[6] .................................................. G11B 5/596
[52] U.S. Cl. .............................. 360/77.08; 360/77.04; 360/77.05; 360/78.14
[58] Field of Search .............................. 360/77.08, 77.07, 360/78.14, 77.05, 77.04, 77.02

[56] References Cited

U.S. PATENT DOCUMENTS

| 4,048,660 | 9/1977 | Dennison et al. | 360/77.08 |
|---|---|---|---|
| 4,400,747 | 8/1983 | Siverling | 360/77.07 |
| 4,499,511 | 2/1985 | Sugaya | 360/77.08 |
| 4,669,004 | 5/1987 | Moon | 360/77.08 X |
| 4,987,355 | 1/1991 | Leaper | 360/77.07 |
| 5,388,010 | 2/1995 | Norton | 360/77.08 |
| 5,453,888 | 9/1995 | Tsunoda | 360/77.07 |
| 5,469,113 | 11/1995 | Steyaert | 360/77.08 |
| 5,483,393 | 1/1996 | Mento | 360/77.08 |

FOREIGN PATENT DOCUMENTS

| 56-22265 | 3/1981 | Japan . |
|---|---|---|
| 58-218079 | 12/1983 | Japan . |
| 61-214285 | 9/1986 | Japan . |
| 63-177381 | 7/1988 | Japan . |
| 64-84483 | 3/1989 | Japan . |
| 1-155573 | 6/1989 | Japan . |
| 3-102685 | 4/1991 | Japan . |

*Primary Examiner*—Aristotelis M. Psitos
*Assistant Examiner*—Alan Faber
*Attorney, Agent, or Firm*—Greer, Burns & Crain, Ltd.

[57] ABSTRACT

Two-phase servo patterns are recorded on a servo area of a data medium of a data storage apparatus such that patterns Q+, N+, N− and Q− are recorded in the stated order, there being a phase shift of 90 degrees between position information N and position information Q.

5 Claims, 8 Drawing Sheets

FIG.8

DATA STORAGE APPARATUS HAVING SERVO CONTROL SYSTEM

BACKGROUND OF THE INVENTION

1. Field of the Invention

The present invention relates to a data storage apparatus in which the movement of a head over a data storage medium is servoed on the basis of servo patterns.

Recently, a high-speed data processing in data processing units is demanded. For example, a high-speed data reading and writing in a magnetic disk apparatus is demanded. Therefore, it is desired that accurate information be obtained relating to the position of the magnetic head as the head moves over the disk, the seek operation be stabilized, and the settling time required to reach a predetermined track be reduced.

2. Description of the Prior Art

Conventional methods of determining the position of a magnetic head of a magnetic disk apparatus include a method whereby position determination is performed such that a magnetic head position signal is created on the basis of a servo signal obtained by reading servo patterns recorded on the magnetic disk. Since the sector servo method and the servo surface servo method are similar to each other, the sector servo method is taken as an example in the following description.

Figure 1:
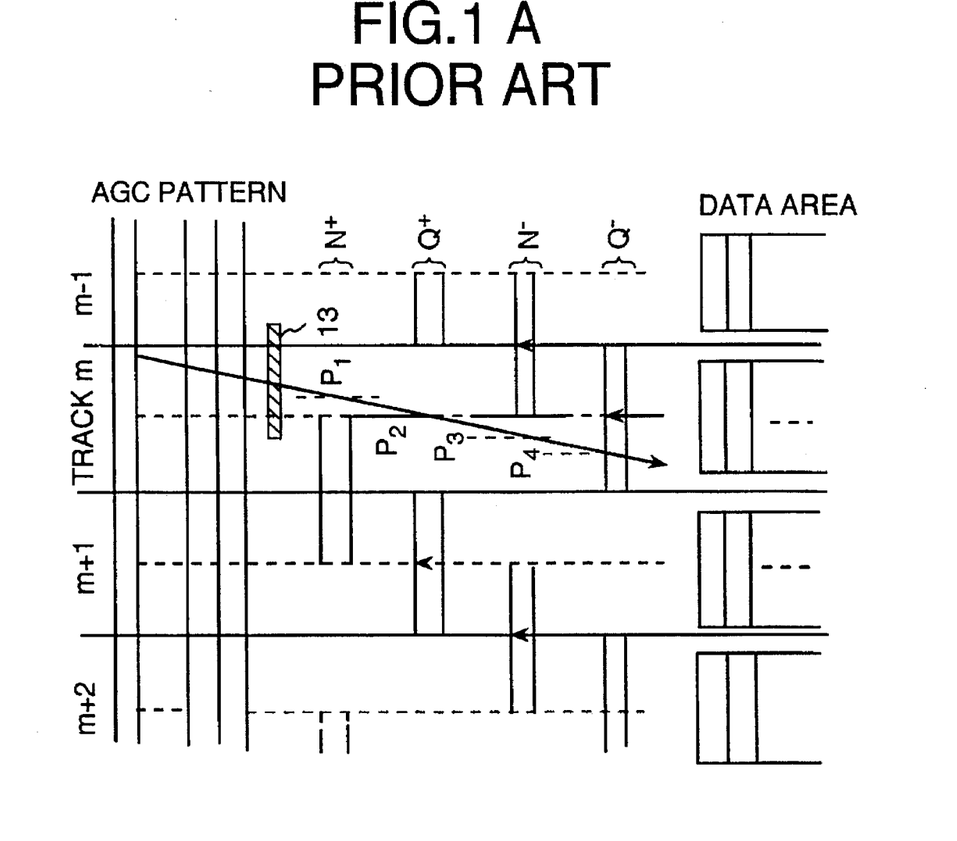
FIGS. 1A and 1B explain servo control using conventional two-phase servo patterns.

FIGS. 1A and 1B explain the servo control based on conventional two-phase servo patterns. FIG. 1A is a schematic diagram showing a locus of the head as it moves over the magnetic disk; FIG. 1B is a waveform diagram of a reproduction output of the head; and FIG. 2 explains a method of producing a position signal.

FIG. 1A shows a part of a servo area 12 formed at the head of a sector, the sector being obtained by dividing a magnetic disk 11 radially into a predetermined number of areas. On each of concentrically formed predetermined number of tracks, an AGC (auto gain controller) pattern and four patterns N+, N−, Q+ and Q− are recorded.

Positive servo patterns N+, Q+ and negative servo patterns N−, Q− are provided so that two-phase servo information N and two-phase servo information Q can be detected and processed at a high precision by means of a differential circuit. There is a phase shift of ¼ of a cycle provided between one pattern and the next disposed on each track. A magnetic head 13 whose position is sought reads the four patterns N+, N−, Q+ and Q− so that the two-phase servo information N and the two-phase servo information Q are obtained.

The two-phase servo information N and the two-phase servo information Q are obtained, as per the following formulas, as a difference between amplitudes of signals obtained as a result of reading positive and negative servo patterns.

$$N=(N+)-(N-) \tag{1}$$

$$Q=(Q+)-(Q-) \tag{2}$$

Figure 2:
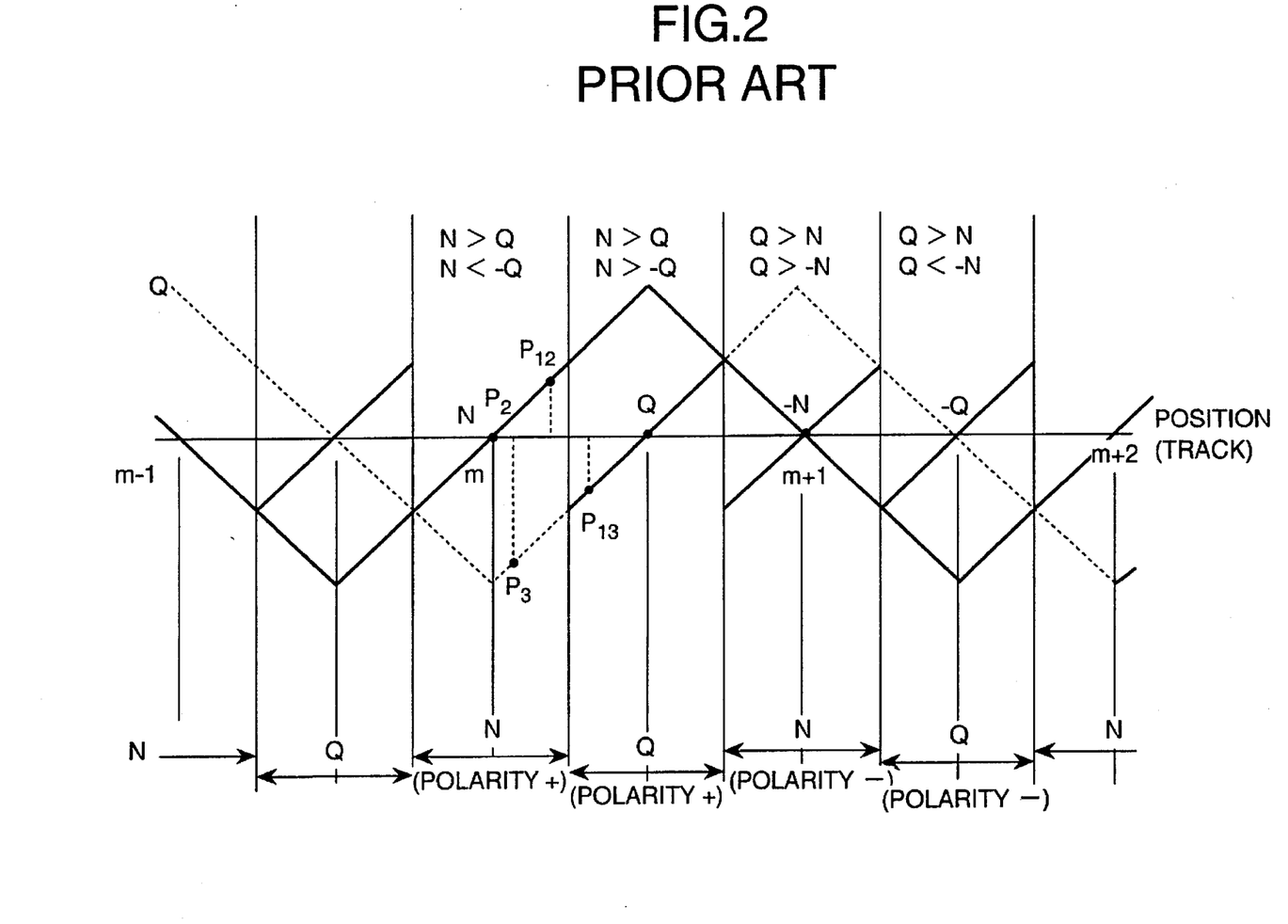
FIG. 2 explains a method of producing a position signal.

As shown in FIG. 2, the smaller, in magnitude, of the information N and the information Q is employed as position information. The smaller one must be employed because there is a need to select that part of a sinusoidal position signal which exhibit a good linearity.

Conventionally, the four servo patterns N+, N−, Q+ and Q− are recorded such that two kinds of sequences (N+, Q+, N−, Q−) and (N+, N−, Q+, Q−) are repeated. The position of the magnetic head 13 is determined at each sampling on the basis of the aforementioned position information so as to determine the velocity at which the magnetic head 13 is to be moved and thus to control the moving velocity, the determination of the velocity being performed on the basis of a difference between the current position and the position obtained at the previous sampling.

The position of the magnetic head 13 is determined such that N and Q are obtained by sampling, a rough determination on a position is made on the basis of the comparison of N and Q in absolute values, and a strict determination is made on the basis of one of the four values ±N and ±Q, the one value being selected on the basis of the result of comparison between N and Q. Sampling timing is set such that one sampling operation is followed by another before the head moves across two tracks, since the position signals N and Q vary at a cycle of two tracks.

A detailed description will now be given, by returning to FIGS. 1A and 1B. The magnetic head 13 reproduces an AGC pattern, whereby a reproduction gain is controlled such that the reproduction output has a predetermined level. When the reproduction is completed, the reproduction gain is fixed. The servo patterns N+, Q+, N− and Q− are reproduced in a state in which the AGC is not activated. The AGC pattern serves as a reference against which the timing for holding the reproduction output of the servo patterns N+, Q+, N−, Q− at their peaks is produced.

Assuming that the reproduction output obtained when the entirety of the magnetic head 13 passes over a servo pattern is 1, the reproduction output obtained when 40% of the magnetic head 13 passes over the servo pattern N+ at a position $P_1$ is 0.4. Subsequently, at a position $P_2$, the magnetic head 13 does not passes over the servo pattern Q+ so that the reproduction output is 0. At a position $P_3$, 40% of the magnetic head 13 passes over the servo pattern N−, and the reproduction output is 0.4. At a position $P_4$, 90% of the magnetic head passes over the servo pattern Q−, and the reproduction output is 0.9.

As a result, the position signal N is 0 (0.4−0.4=0), and the position signal Q is −0.9 (0−0.9). Therefore, if the magnetic head 13 is tracking a track m, the position signal N is 0, and the position signal Q is 0.9.

The magnetic head 13 is in movement, and the position signal N is produced on the basis of the reproduction outputs obtained at the positions $P_1$ and $P_3$. Therefore, a reproduction signal providing an appearance that the magnetic head 13 is located at the position $P_2$ between the position $P_1$ and the position $P_3$. Similarly, the position signal Q is produced on the basis of the reproduction output obtained at the positions $P_2$ and $P_4$. Therefore, a reproduction signal providing an appearance that the magnetic head 13 is located at the position $P_3$ between the position $P_2$ and the position $P_4$.

FIG. 2 shows a method of producing a positional signal. As shown in FIG. 2, $P_2$ indicates a position at which the position signal N is 0, and $P_3$ indicates a position at which the position signal Q is −0.9. Accordingly, the position of the magnetic head 13 is determined to be the position $P_2$ on the basis of the position signal N. Assuming that $P_{12}$ indicates a position at which the next sampled value of N is obtained, and that $P_{13}$ indicates a position at which the next sampled value of Q is obtained, as shown in FIG. 2, the position of the magnetic head 13 is obtained on the basis of the position signal Q as a result of comparing the positional signal N and the positional signal Q.

Thus, the distance over which the magnetic head has traveled is determined to be the distance between the position $P_2$ and the position $P_{13}$.

However, since the servo patterns are arranged in the aforementioned order, the positions indicated by the position information N and by the position information Q differ from each other. Servo control is performed at predetermined intervals by sampling servo technology. An accurate position of the magnetic head 13 can not be determined when the position indicated by the position information N and that indicated by the position information Q differ from each other.

The distance that the magnetic head 13 travels is actually the distance between the position $P_2$ and the position $P_{12}$ (or the distance between the position $P_3$ and the position $P_{13}$) when the distance between the position $P_2$ and the position $P_{13}$ is assumed.

Accordingly, an erroneous calculation of a velocity may be made during a velocity control because erroneous distance data is referred to. Especially, an erroneous calculation of a velocity may be made when the magnetic head is slowed down before reaching a target track. The magnetic head 13 may be overshot or undershot with respect to the target track. This causes a read operation or a write operation to be delayed. In some cases, the magnetic head has to wait for one full rotation of the disk.

The above problem becomes noticeable when an acceleration and a velocity in a seek mode are increased for shorter access time. When the problem occurs, the seek operation becomes unstable, and the settling time required to reach a desired track becomes long, thus making it impossible to speed up the operation.

SUMMARY OF THE INVENTION

Accordingly, a general object of the present invention is to provide a novel and useful magnetic disk apparatus in which the aforementioned problems of the prior art are eliminated.

Another and more specific object of the present invention is to provide a magnetic disk apparatus in which the seek operation is stable, and the settling time is reduced.

The above-mentioned objects of the present invention are achieved by a disk apparatus comprising:

a disk in which a first, second, third and fourth servo patterns having different phases are recorded in a successive manner;

a head for reproducing servo patterns from the disk;

first, second, third and fourth reproduction output detecting means for detecting a reproduction output of the first, second, third and fourth servo patterns, respectively;

first position signal generating means for generating a first position signal on the basis of the reproduction output detected by the first and fourth reproduction output detecting means;

second position signal generating means for generating a second position signal on the basis the reproduction output detected by the second and third reproduction output detecting means; and a head position controller for controlling the position of the head on the basis of the first and second position signals, the first, second third and fourth servo patterns being recorded on the disk such that a phase shift of approximately 90 degrees exists between the first position signal and the second position signal.

In a preferred embodiment of the present invention the disk apparatus is constructed such that second, third and fourth servo patterns are formed of a burst pattern having a predetermined number of reversals of magnetization.

In another preferred embodiment of the present invention, the disk apparatus is constructed such that the reproduction output detecting means detects the reproduction outputs of the first, second, third and fourth servo patterns in a successive manner, and latches the reproduction outputs at predetermined timings, whereupon the reproduction output detecting means outputs the reproduction outputs of the first and fourth servo patterns to the first position signal generating means, and outputs the reproduction outputs of the second and third servo patterns to the second position signal generating means.

In still another preferred embodiment of the present invention, the disk apparatus is constructed such that the reproduction output detecting means comprises:

first, second, third and fourth capacitors which receive the input of the reproduction outputs obtained from the first, second, third and fourth servo patterns, respectively;

an AD converter for converting the outputs of the first, second, third and fourth capacitors into digital values via a multiplexor;

timing generating means for generating timings that are referred to when the reproduction outputs of the first, second, third and fourth servo patterns are latched in the first, second, third and fourth capacitors, and when the same reproduction outputs are output to the AD converter; and first, second, third and fourth registers for storing the output of the AD converter.

According to the present invention, first through fourth servo patterns are recorded on a disk, wherein there is a phase shift of approximately 90 degrees between a first position signal and a second position signal. The fist and second position signals are generated on the basis of reproduction outputs of the first through fourth servo patterns so as to control the position of a head. With this feature, it is possible to determine the position of the head accurately. It is also possible to stabilize seek operation and to speed up the apparatus performance by reducing the settling time.

The aforementioned construction of the present invention wherein the first through fourth servo patterns are formed of a burst pattern having a predetermined number of reversals of magnetization ensures that the present invention can be applied to a case in which the patterns have a great length, and that the position of the head can be determined accurately.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 3:
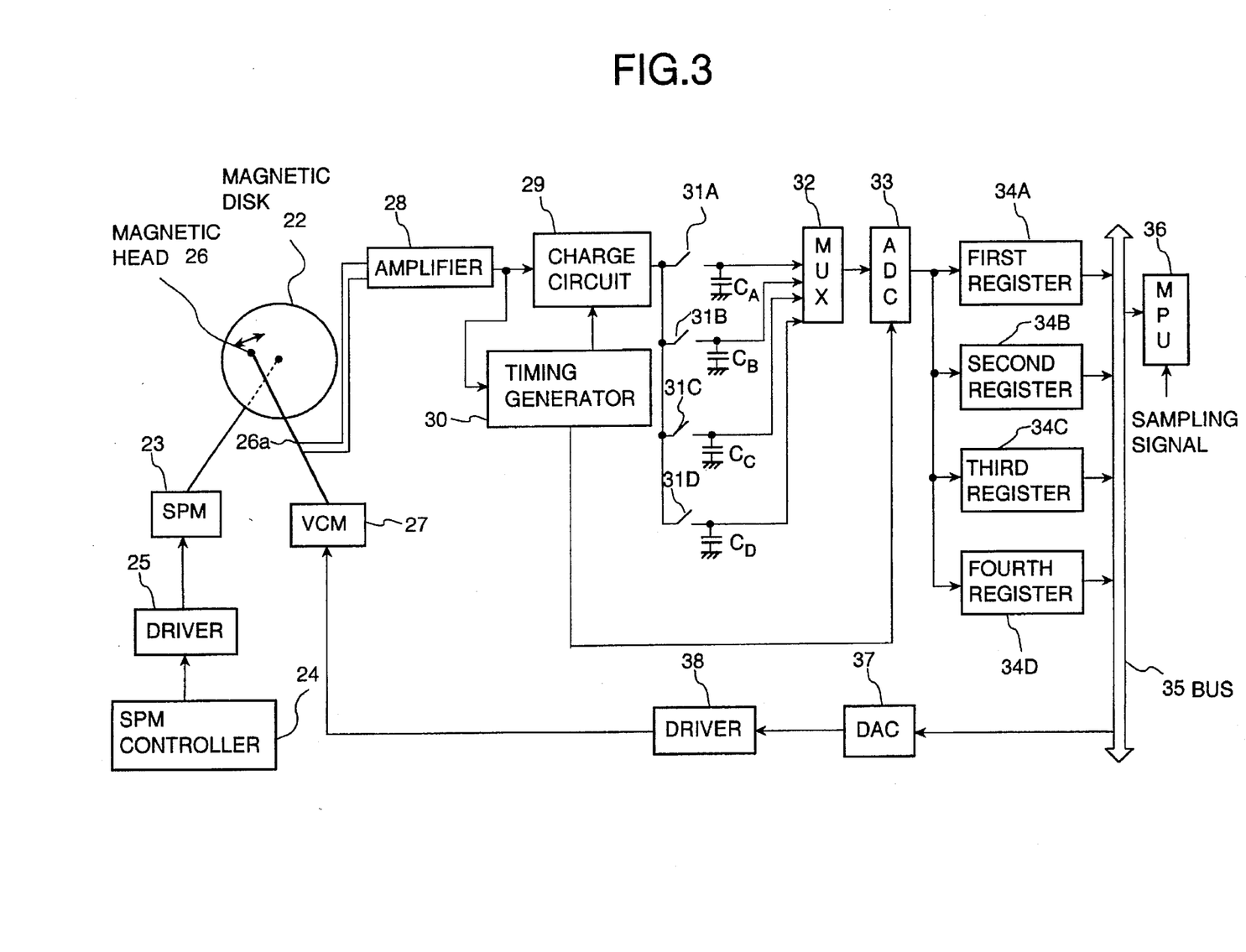
FIG. 3 shows a construction of an embodiment of the present invention.

FIG. 3 shows a construction of an embodiment of the present invention. FIG. 3 is a block diagram showing a circuit relating to servo control of the magnetic head used in a magnetic disk apparatus. The remaining construction of the apparatus is assumed to be the same as that of the conventional magnetic disk apparatus.

In a magnetic disk apparatus 21 shown in FIG. 3, a magnetic disk 22 (recording medium), which will be described in detail later, is rotated at a regular velocity by a spindle motor (SPM) 23. The SPM 23 is controlled by an SPM controller 24 via a driver 25. While the magnetic disk 22 is illustrated as one disk in FIG. 3, an appropriate number of disks may be mounted.

A magnetic head 26 mounted on an arm 26a is disposed on the surface of the magnetic disk 22 (or above the surface thereof), and is moved in a radial direction with respect to the magnetic disk 22. The magnetic head 26 is moved by a voice coil motor (VCM) 27 which embodies a head position controller. The magnetic head 26 may be disposed on or above both surfaces of the magnetic disk 22.

A servo information read signal (a two-phase position signal described later) obtained by the magnetic head 26 is input to a charge circuit 29 and a timing generator 30 via an amplifier 28. A timing signal generated by the timing generator 30 is sent to a charge circuit 29.

The charge circuit 29 controls four switches $31_A$–$31_D$ so that four capacitors $C_A$–$C_D$ corresponding to the two-phase position signals are charged with a current corresponding to the signals. The charged signals of the capacitors $C_A$–$C_D$ are multiplexed by a multiplexor (MUX) 32 and sent to an analog-digital converter (ADC) 33. In response to the timing signal from the timing generator 30, digital signals are stored in the first through fourth registers $34_A$–$34_D$ corresponding to the two-phase position signals. The amplifier 28, the charge circuit 29, the timing generator 30, the switches $31_A$–$31_D$, the multiplexor 32, the analog-digital converter 33, the registers $34_A$–$34_D$ constitute a reproduction output detecting means.

The digital signals from the first through fourth registers $34_A$–$34_D$ are sent to a microprocessor (MPU) 36, which embodies a first and second position signal generating means, via a bus 35. The MPU 36 is equipped with a target velocity table and the like. A control signal from the MPU 36 is transmitted over the bus 35 and converted into an analog signal by a digital-analog converter (DAC) 37, the analog signal controlling the VCM 27 via a driver 38.

Figure 4:
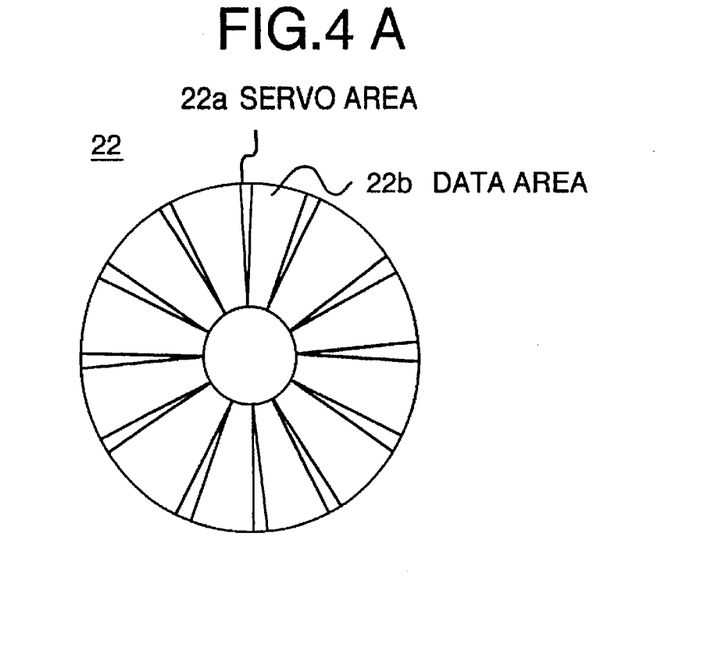
FIGS. 4A and 4B explain servo information on a magnetic disk of FIG. 3.
Figure 5:
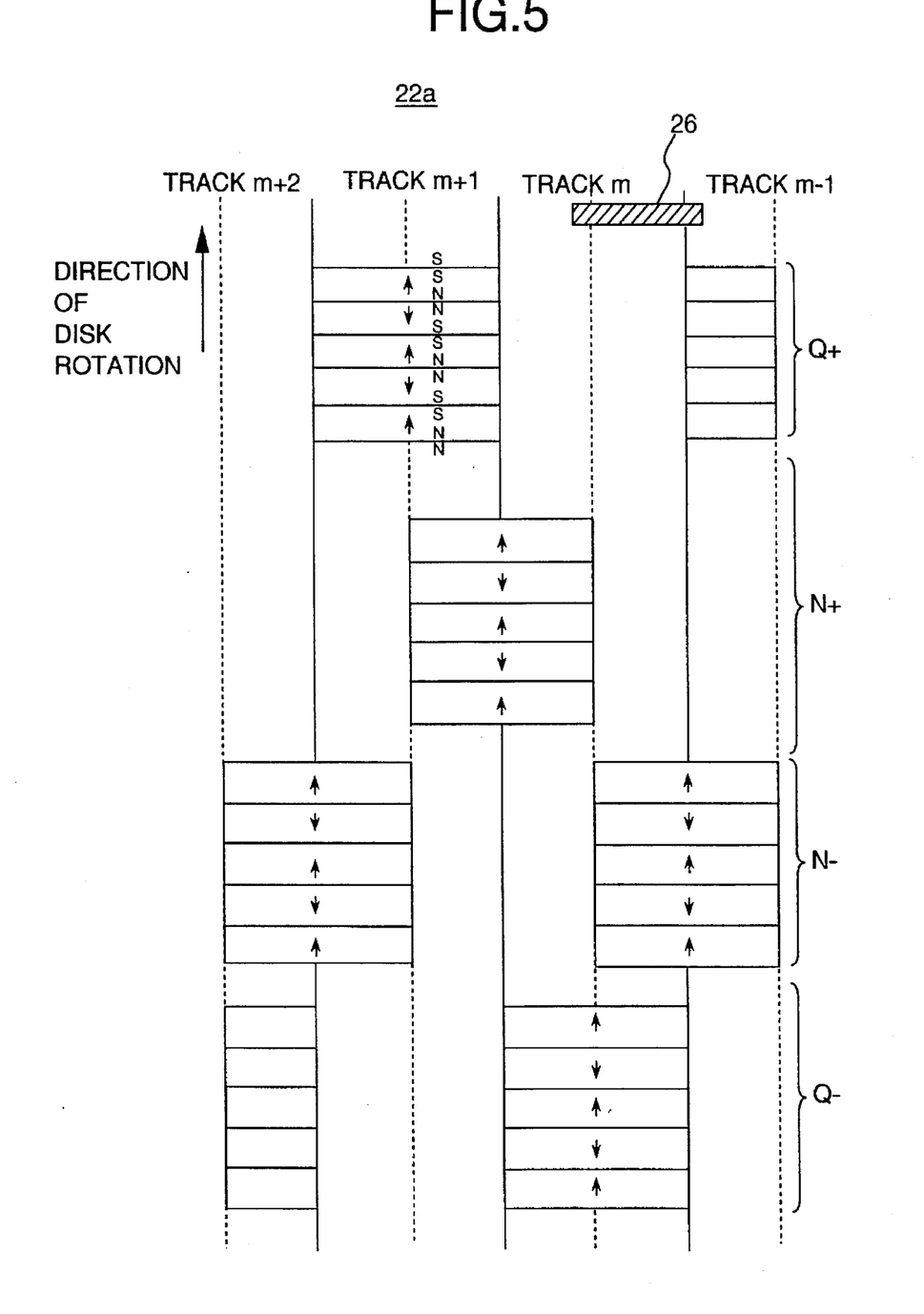
FIG. 5 explains a servo pattern of FIG. 4B.

FIGS. 4A and 4B explain the servo information on the magnetic disk shown in FIG. 3. While it is assumed that the sector servo method is employed in this embodiment, the following description can equally be applied to the servo surface servo method. FIG. 5 explains the servo pattern of FIG. 4B.

As shown in FIG. 4A, a predetermined number of servo areas 22a and data areas 22b are formed on both surfaces of the magnetic disk 22 so as to extend in a radial direction. A servo mark, which indicates a start of a servo operation, a track address number (pattern) and a servo pattern are recorded in the servo area 22a. As described with reference to FIG. 1A and 1B, the AGC pattern controls the reproduction gain.

As shown in FIG. 4B, the servo patterns are formed such that the two-phase servo pattern which provides the two-phase position signal is formed so as to lie on a predetermined track or across two tracks. The servo patterns are arranged such that a first servo pattern Q+ is the headmost pattern in the direction of the disk rotation, followed by a second servo pattern N+, a third servo pattern N– and a fourth servo pattern Q–, an interval of ¼ of a cycle (90 degrees) being disposed between the adjacent patterns. That is, the servo patterns are arranged such that the first and fourth servo patterns Q+ and Q– are disposed on the periphery, while the second and third servo patterns N+ and N– are disposed in the middle.

Each of the patterns Q+, N+, N– and Q– is formed of a digit pattern (having two-byte cycle) or single bits, as shown in FIG. 4B. Or, as shown in FIG. 5, each of the patterns may be formed of a burst pattern comprising a unit of six (or more, or less) magnetization reversal pulses.

Figure 6:
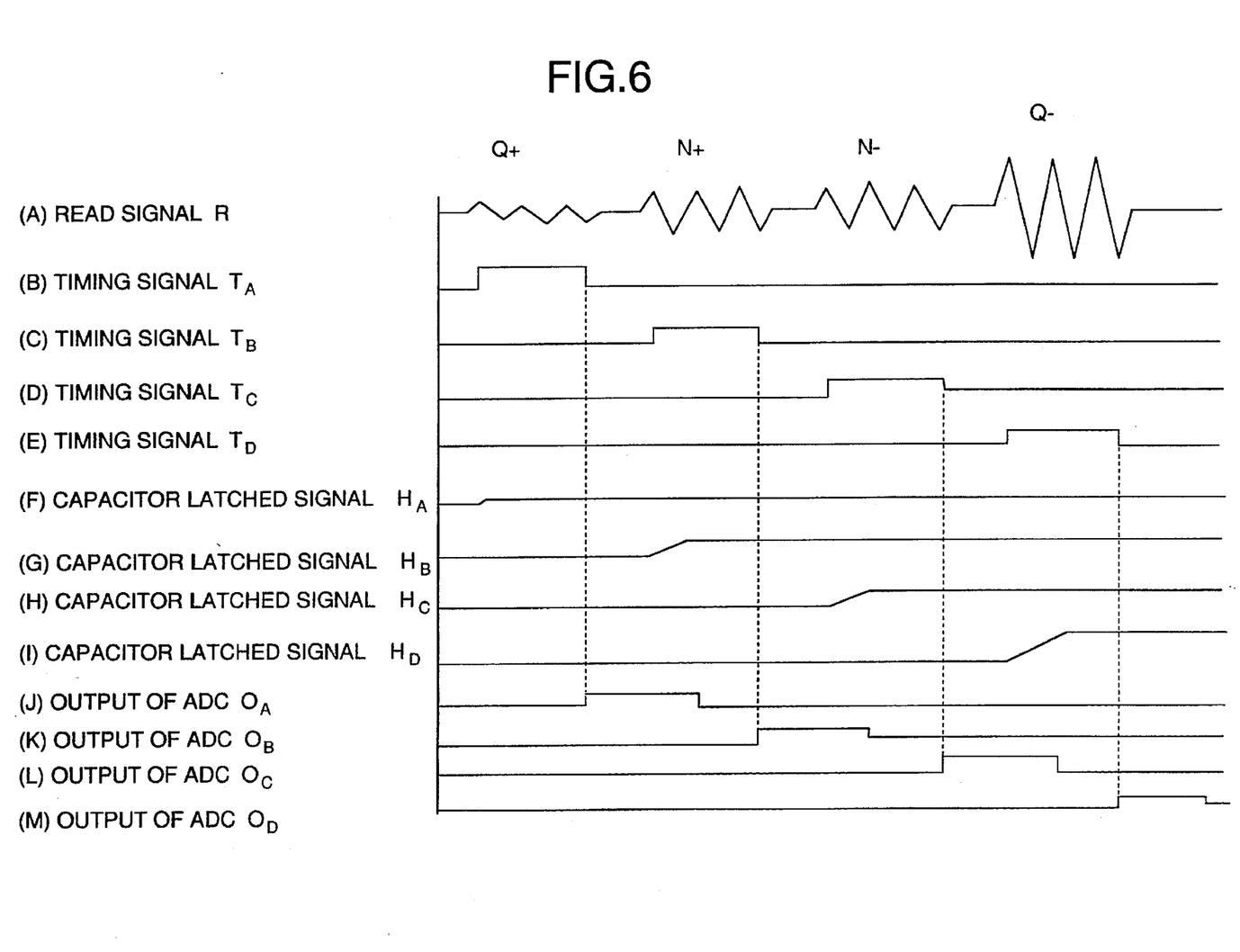
FIG. 6 depicts a timing chart for servo pattern detection effected by a circuit shown in FIG. 3.

FIG. 6 depicts a timing chart for servo pattern detection effected by a circuit shown in FIG. 3. The magnetic head 26 is moved by the VCM 27 in a radial direction of the magnetic disk 22 rotated by the SPM 23 at a regular velocity. When the magnetic head 26 detects the servo mark on the servo area 22a on a predetermined track while being moved by the VCM 27 in the radial direction of the magnetic disk 22 rotated by the SPM 23 at a regular velocity, the servo control is initiated. First, the AGC pattern is reproduced so that the reproduction gain of the amplifier 28 is fixed when the reproduction is completed. The AGC pattern is then used as the reference against which the timing for holding the servo pattern (N+, Q+, N–, Q–) reproduction output of the timing generator 30 at their peaks is produced.

The reversal in magnetization in the servo area 22a is detected and amplified by the amplifier 28 by a predetermined gain. Then, the timing generator 30 is activated, and the timing signals $T_A$–$T_D$ are generated at the aforementioned timings corresponding to the servo patterns (Q+, N+, N– and Q–)

In response to the timing signals $T_A$–$T_D$, the charge circuit 29 charges the capacitors $C_A$–$C_D$, respectively, via the switches $31_A$–$31_D$, respectively. The rectifying function of the capacitors causes the amplitude of a read signal R (the servo pattern shown in (A) of FIG. 6), to be detected and latched as latched signals $H_A$–$H_D$ (F)–(I) of FIG. 6. The latched signals $H_A$–$H_D$ corresponding to the amplitude of the read signal R occurring in the capacitors $C_A$–$C_D$, respectively, are multiplexed by the MUX 32 and sent to the ADC 33.

When the timing signal $T_A$ falls, the ADC 33 causes an output $O_A$ to rise, subjects the latched signal $H_A$ to analog-digital conversion, and stores the result of the analog-digital conversion in the first register $34_A$ when the output signal $O_A$ falls. Similarly, output signals $O_B$–$O_D$ of the ADC 33 rise in response to the fall of the timing signals $T_B$–$T_D$, and the result of the A/D conversion of the respective latched signals $H_B$–$H_D$ are stored in the second through fourth registers $34_B$–$34_D$, respectively ((J)–(M) of FIG. 6).

That is, the first register $34_A$ stores a digital value showing the amplitude of the pattern Q+, the second register $34_B$ stores a digital value indicating the amplitude of the pattern N+, the third register $34_C$ stores a digital value indicating the amplitude of the pattern N–, and the fourth register $34_D$ stores a digital value indicating the amplitude of the pattern Q–.

The servo control is effected such that the MPU 36 reads the values of the first through fourth registers $34_A$–$34_D$, thus obtaining the position information N and Q by calculation, and determining the current position of the magnetic head 26.

Figure 7:
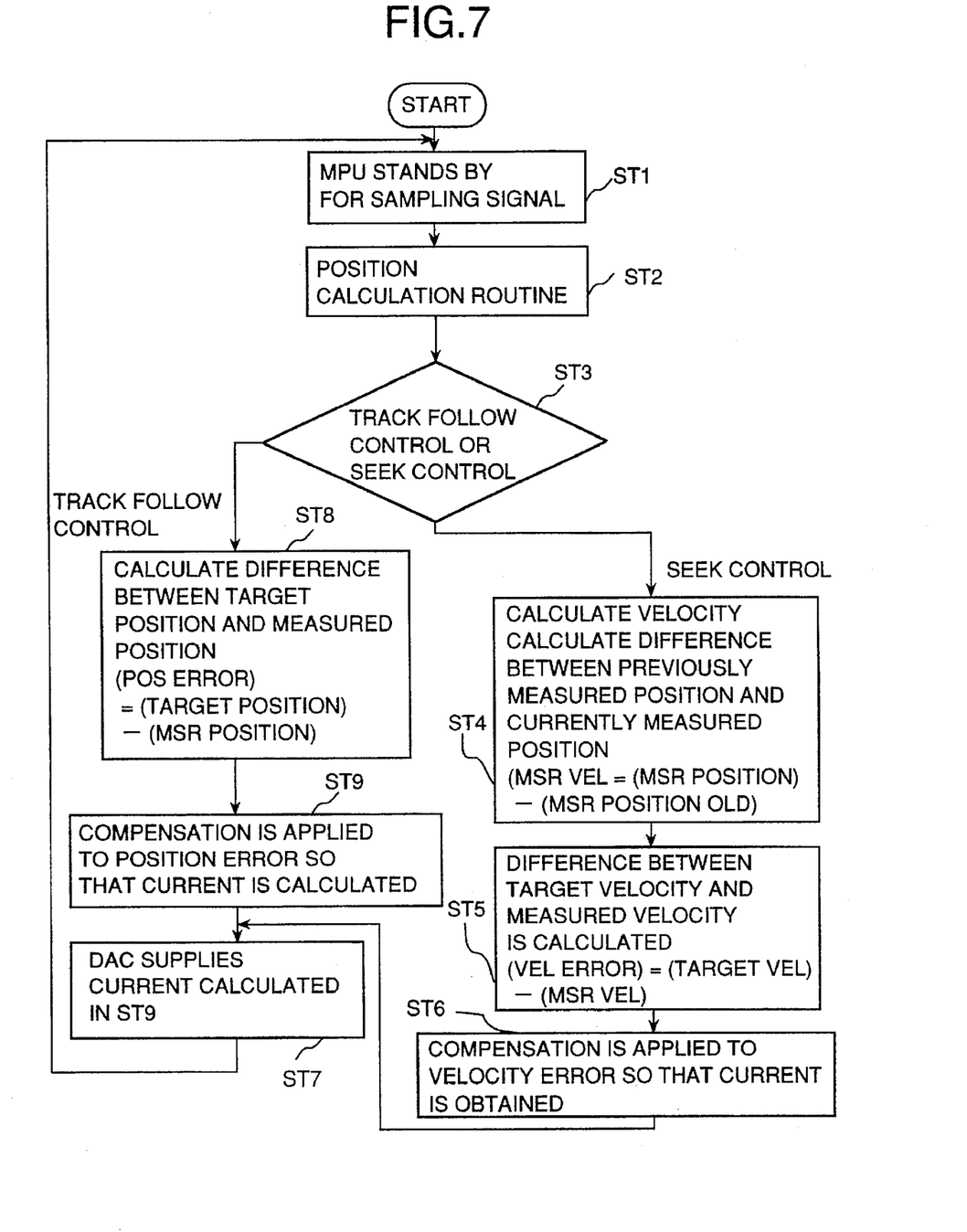
FIG. 7 is a flowchart for servo control of the present invention.
Figure 8:
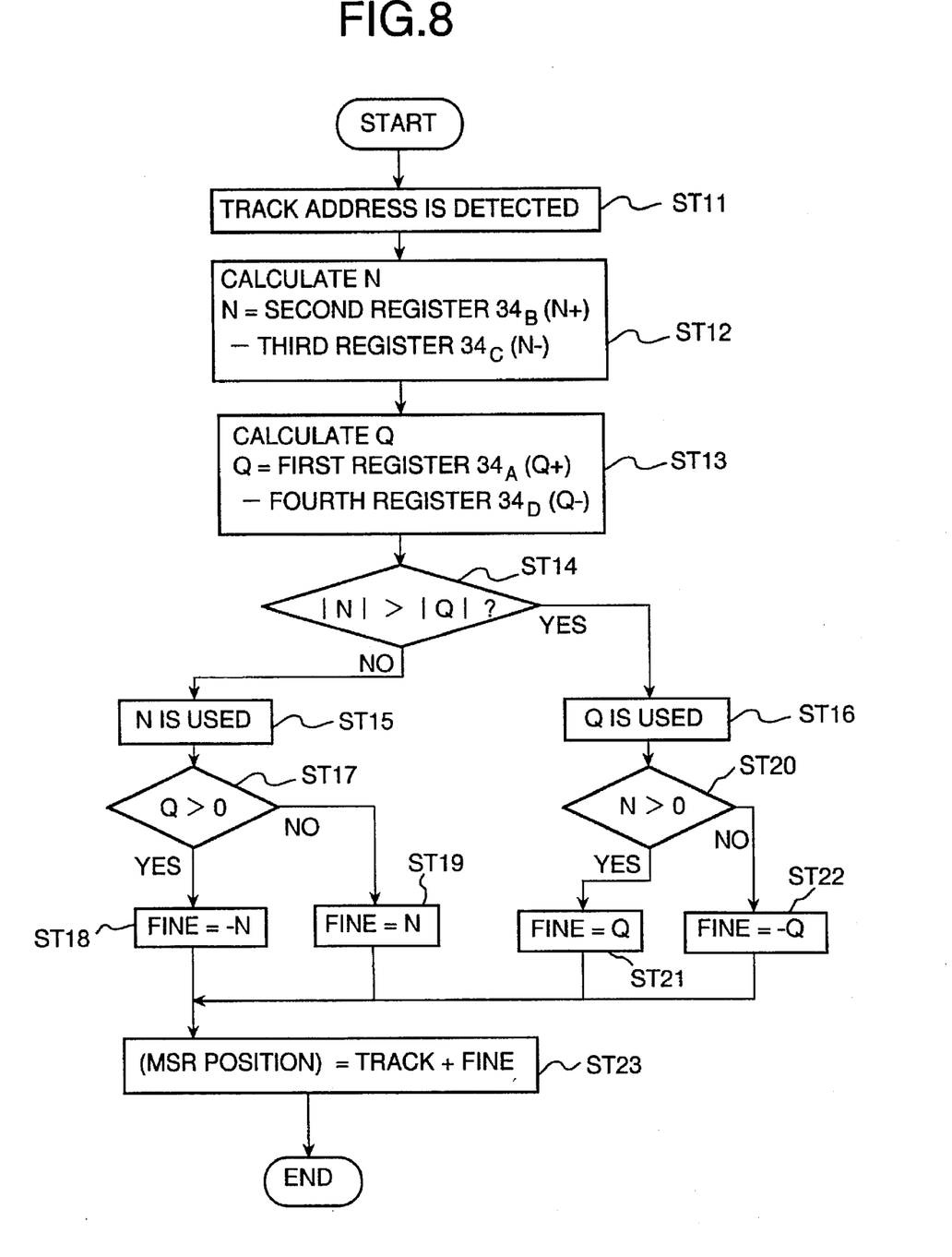
FIG. 8 is a flowchart for position calculation of FIG. 7.

FIG. 7 is a flowchart for servo control of the present invention, and FIG. 8 is a flowchart for position calculation of FIG. 7.

Referring to FIG. 7, the MPU 36 is in a standby state until the MPU 36 receives a sampling signal for sampling the position information provided by the magnetic head 26, the sampling being done at predetermined time intervals (ST 1). When the sampling signal arrives, the MPU 36 put a position calculation routine into operation (ST 2).

Referring to FIG. 8, the position calculation is conducted such that the track address number read by the magnetic head 26 from the servo area 22a is detected (ST 11). Thereupon, the value of the pattern N+ is read from the second register 34$_B$, and the value of the pattern N− is read from the third register 34$_C$. The difference between N+ and N− is calculated so that the position information N is obtained (ST 12). The value of the pattern Q+ is read from the first register 34A, and the value of the pattern Q− is read from the fourth register 34$_D$. The difference between Q+ and Q− is calculated so that the position information Q is obtained (ST 13).

The absolute value of N and that of Q are compared with each other (ST14). As indicated in FIG. 2 by a solid line corresponding to N and a broken line corresponding to Q, if N is smaller than Q, then N is used as the position information (ST15). If Q is smaller than N, then Q is used as the position information (ST16). When N is used as the position information, a determination is made as to the polarity of the position information Q (ST17). If Q is positive, the polarity of the position information N is set to be negative (ST18). If Q is negative, the polarity of the position information N is set to be positive (ST19).

When Q is used as the position information, a determination is made as to the polarity of the position information N (ST20). If N is positive, the polarity of the position information Q is set to be positive (ST21). If N is negative, the polarity of the position information Q is set to be negative (ST22).

The current position of the magnetic head 26 (MSR POSITION) is detected by adding the value of the position information (N+, N−, Q+or Q−) used, to the track address number (ST23).

Referring back to FIG. 7, when the current position of the magnetic head 26 (MSR POSITION) is detected, a determination is made as to whether the movement of the magnetic head 26 is a result of the seek control in a seek operation or a result of the track follow control in a track follow operation (ST3). When the movement of the head is the result of the seek control, the velocity of the magnetic head 26 is calculated (ST4). The track address number of the servo area 22a and the position information N or Q are used in the calculation of the velocity. That is, a difference between the track address number obtained in the previous servo area 22a and the current track address number sampled is calculated, and a difference between the value of the position information (MSR POSITION OLD) obtained in the previous servo area 22a and the value of the current position information sampled is obtained, so that the current velocity (MSR VEL) can be obtained.

A target velocity table corresponding to the seek distance is referred to, and a difference (velocity error VEL ERROR) between the target velocity and the measured velocity (MSR VEL) obtained in ST14 is calculated (ST 5), the calculation being conducted for each timing (sample time) at which the servo sector (servo area 22a) occurs. A compensation (COMPENSATOR) is applied to the velocity error (VEL ERROR) so that the current corresponding to the velocity error is obtained (ST6). The DAC 37 supplies the current via the driver 38 so as to drive the VCM 27 (ST7).

In this way, the VCM 27 is controlled to accelerate or decelerate the magnetic head 26 in a transversal direction so that the target velocity is arrived at and the velocity at the target track becomes zero. After the magnetic head is moved to the target track, the track follow control is initiated.

Subsequently, in the track follow control mode of the magnetic head 26, a difference (position error POS ERROR) between the target position (TARGET POSITION) and the current measured position (MSR POSITION) calculated in ST2 is calculated (ST8). A compensation (COMPENSATOR) is applied to the position error (POS ERROR) obtained so that a current corresponding to the position error is obtained (ST9). The DAC supplies the current via the driver 38 so as to drive the VCM 27 (ST7).

In this way, the settling time required to reach the target track is reduced, and the magnetic head 26 can be set in the middle of the track.

As has been described, the current position of the magnetic head 26 is detected such that the servo patterns Q+, N+, N− and Q− are provided in this order so that the position indicated by the position information N and the position information Q match the center of the servo patterns. When the amplitude of the read signal derived from the pattern is latched in the corresponding one of the capacitors $C_A$–$C_D$, and is subjected A/D conversion in a successive manner, error occurring due to discharge of the latched voltage is controlled to be small, thus making it possible to obtain accurate position information. By forming each pattern of a burst pattern in which a large number of reversal in magnetization occur, it is easy to match the position indicated by the position information N and that indicated by the position information Q when the pattern has a relatively great length.

It is possible to obtain accurate position information corresponding to the sampling time in the sector servo method. Thus, it is possible to achieve a stable seek operation and to reduce the settling time, thus improving the speed of the performance of the apparatus.

While the order of the servo patterns in the aforementioned embodiment is (Q+, N+, N−, Q−), the following order of the servo patterns result in the same effect: (Q+, N−, N+, Q−), (Q−, N+, N−, Q+) , (Q−, N−, N+, Q+), (N+, Q+, Q−, N−), (N+, Q−, Q+, N−), (N−, Q+, Q−, N+), (N−, Q−, Q+, N+).

While it is assumed that the aforementioned embodiment is applied to the sector servo method, it is also applicable to the servo surface servo method. The servo patterns arranged in one of the orders mentioned above are recorded in the magnetic disk surface area that is dedicated for the servo control. The servo patterns are read by the servo head, whereupon the seek operation and the track operation of the magnetic head are carried out.

The present invention is not limited to the above described embodiments, and variations and modifications may be made without departing from the scope of the present invention.

What is claimed is:

1. A data storage apparatus comprising:
    a data medium having a plurality of tracks, each of said tracks having at least two of first, second, third and fourth servo patterns recorded therein with successively different phases;
    a head for reproducing servo patterns from said disk;

first, second, third and fourth reproduction output detecting means for detecting a reproduction output of said first, second, third and fourth servo patterns, respectively, electronically connected to said head;

first position signal generating means for generating a first position signal on the basis of the reproduction output detected by said first and fourth reproduction output detecting means;

second position signal generating means for generating a second position signal on the basis the reproduction output detected by said second and third reproduction output detecting means; and a head position controller for controlling the position of the head on the basis of the smaller in magnitude of said first and second position signals, said first, second, third and fourth servo patterns being recorded on said data medium such that a phase shift between said first position signal and said second position signal is approximately 90 degrees.

2. The data storage apparatus as claimed in claim 1, wherein said first, second, third and fourth servo patterns are formed of a burst pattern having a predetermined number of reversals of magnetization.

3. The data storage apparatus as claimed in claim 1, wherein said reproduction output detecting means detects the reproduction outputs of said first, second, third and fourth servo patterns in a successive manner, and latches the reproduction outputs at predetermined timings, whereupon said reproduction output detecting means outputs the reproduction outputs of said first and fourth servo patterns to said first position signal generating means, and outputs the reproduction outputs of said second and third servo patterns to said second position signal generating means.

4. The data storage apparatus as claimed in claim 3, wherein said reproduction output detecting means comprises:

first, second, third and fourth capacitors which receive the input of the reproduction outputs obtained from said first, second, third and fourth servo patterns, respectively;

an AD converter for converting the outputs of said first, second, third and fourth capacitors into digital values via a multiplexor;

timing generating means for generating timings that are referred to when the reproduction outputs of said first, second, third and fourth servo patterns are latched in said first, second, third and fourth capacitors, and when the same reproduction outputs are output to said AD converter; and first, second, third and fourth registers for storing the output of said AD converter.

5. The data storage apparatus as claimed in claim 2, wherein said reproduction output detecting means detects the reproduction outputs of said first, second, third and fourth servo patterns in a successive manner, and latches the reproduction outputs at predetermined timings, whereupon said reproduction output detecting means outputs the reproduction outputs of said first and fourth servo patterns to said first position signal generating means, and outputs the reproduction outputs of said second and third servo patterns to said second position signal generating means.

* * * * *